Jan. 7, 1969     L. R. GALE ETAL     3,420,142
MACHINE FOR CUTTING FORMATIONS OF DIFFERENT SHAPES IN FIBERBOARD
Filed Sept. 15, 1966     Sheet 1 of 3
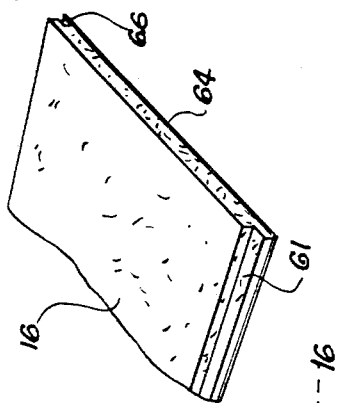
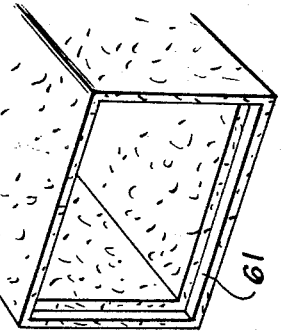
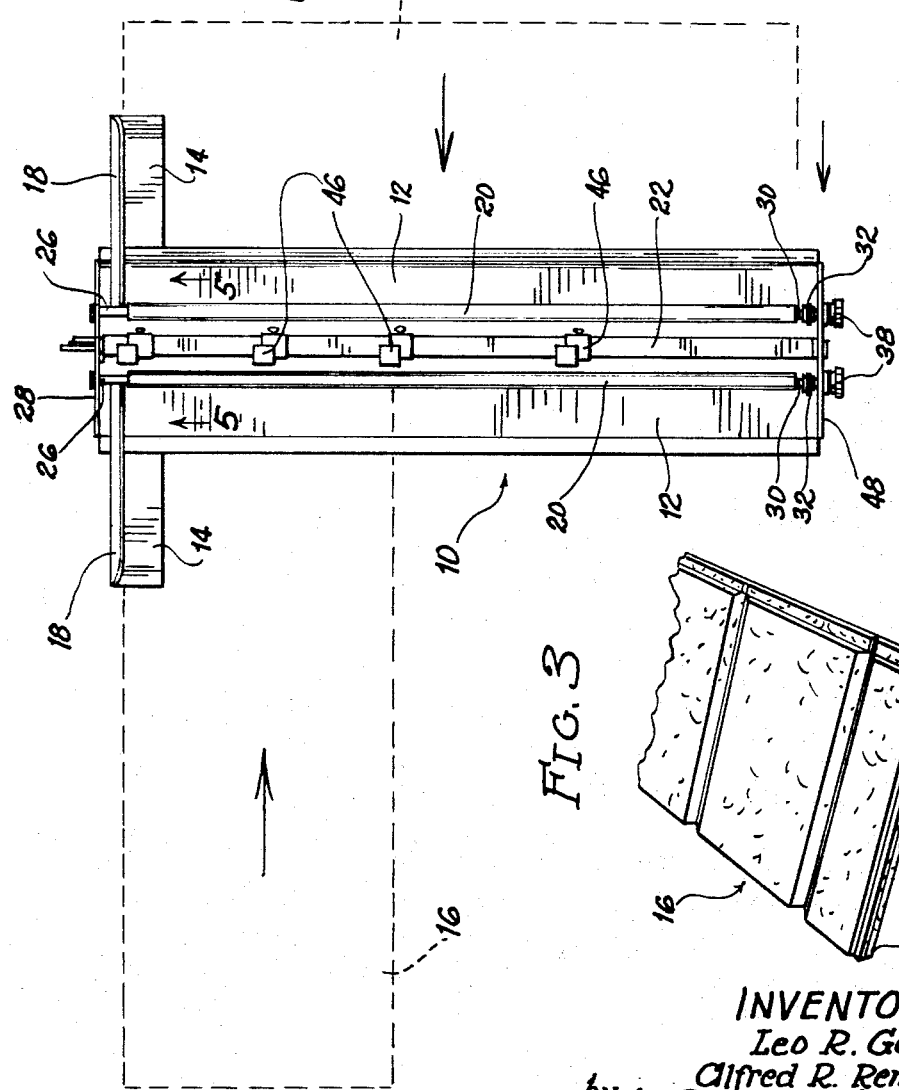
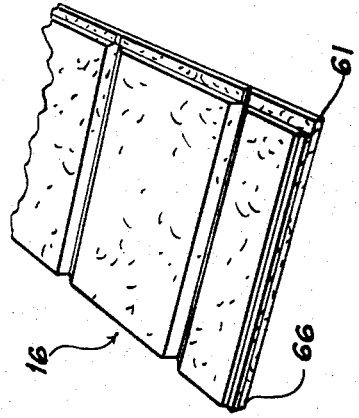
INVENTORS
Leo R. Gale
Alfred R. Remack
by McDougall Hersh, Scott and Ladd
Att'ys

United States Patent Office 3,420,142
Patented Jan. 7, 1969

1

3,420,142
MACHINE FOR CUTTING FORMATIONS OF
DIFFERENT SHAPES IN FIBERBOARD
Leo R. Gale, Morton Grove, and Alfred R. Remack,
Addison, Ill., assignors to The Lockformer Company,
Chicago, Ill., a corporation of Illinois
Filed Sept. 15, 1966, Ser. No. 579,627
U.S. Cl. 90—24                          8 Claims
Int. Cl. B23d 1/26

This invention relates to a construction which is particularly suited for the formation of fiberboard.

Various types of fiberboard are manufactured for use in a wide variety of applications. In many instances, it is necessary to form the board whereby it can be provided in different shapes thereby making it suitable for a variety of different applications.

Glass fiberboard is widely employed for many different applications. In one particular application, the glass fiberboard is formed into ducts which are ideally suited for heating and cooling systems. Such ducts have the desired insulating characteristics and they are extremely easy to handle from the standpoint of installation. Thus, the ducts are light in weight, can be readily cut to provide necessary dimensions and can be secured to one another without difficulty.

The instant invention will be described with reference to the formation of glass fiberboards. The particular cutting operations involved in this formation are designed to adapt the boards for assembly into ducts. It will be appreciated, however, that the concepts of this invention will be applicable to other uses, and that the description provided is not to be considered limiting when determining the scope of the appended claims.

It is a basic object of this invention to provide an improved construction designed to effect the formation of fiberboard constructions.

It is a more particular object of this invention to provide a construction of the type described which is particularly suitable for the formation of fiberboard products whereby the products can be utilized for a variety of applications.

It is a further object of this invention to provide a construction of the type described which is adapted to efficiently and automatically cut and form glass fiberboards whereby the glass fiber can be employed in the construction of ducts.

These and other objects of this invention will appear hereinafter and for purposes of illustration but not of limitation, specific embodiments of this invention are shown in the accompanying drawings in which:

FIGURE 1 is a plan view of the board forming construction of this invention;

FIGURE 2 is a fragmentary perspective view illustrating a typical configuration of a partially formed fiberboard produced on the construction of FIGURE 1;

FIGURE 3 is a fragmentary perspective view illustrating a typical fiberboard after completion of forming;

FIGURE 4 is a fragmentary perspective view illustrating the fiberboard formed into a duct configuration;

2

Figure 11:
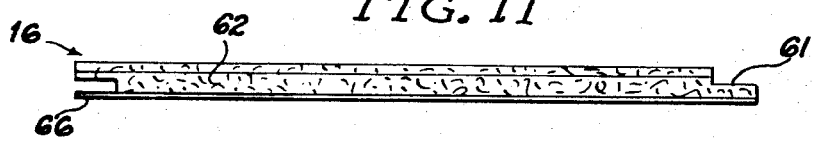

FIGURE 11 is an end view of the completed board illustrated in FIGURE 3; and

Figure 12:
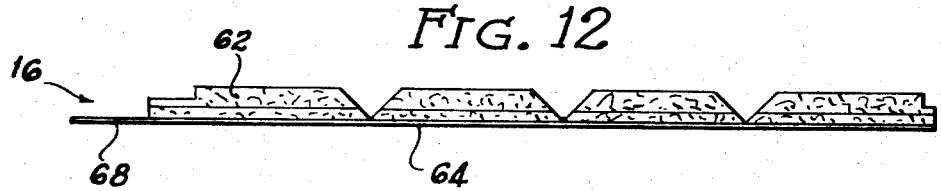

FIGURE 12 is a side view of the completed board illustrated in FIGURE 3.

The instant invention generally comprises a construction including a table having a tool carrying beam mounted thereon. Fiberboards are adapted to be brought into position for movement relative to the beam whereby tools carried by the beam are adapted to cut into the board for forming the board.

The tool carrying beam is characterized by separate tool carrying portions. Means are provided for positioning the beam whereby one of the tool carrying portions will be located in an operative position while the other tool carrying portion is in an inoperative position. With this arrangement, the board can be moved in one direction relative to the beam for formation by one set of tools and in the opposite direction for formation by another set of tools.

In the preferred practice of the invention, drive rollers are provided for moving the board while the beam remains stationary. The board is adapted to be passed adjacent the beam for operation of one set of tools when the drive rollers are moving in one direction.

After the board is passed completely by the beam, the position of the beam can be shifted whereby a different set of tools will be presented for operation on the board. In the formation of glass fiber ducts, the glass fiberboard is rotated through 90° before passage through the construction a second time. A reversing switch is associated with the drive rollers whereby the board will be drawn through the construction for operation of the second set of tools. The construction is, thus, adapted to provide both longitudinal and transverse cuts in the board.

FIGURE 1 illustrates a construction 10 which includes table portions 12 having extensions 14. Glass fiberboards 16 are adapted to be placed on the table portions 12 with edges of the board being situated against a guide flange 18 forming part of the extensions 14. It will be apparent that positioning of the boards against the guide flanges will provide for accurate alignment of a board during each movement through the machine.

Figure 5:
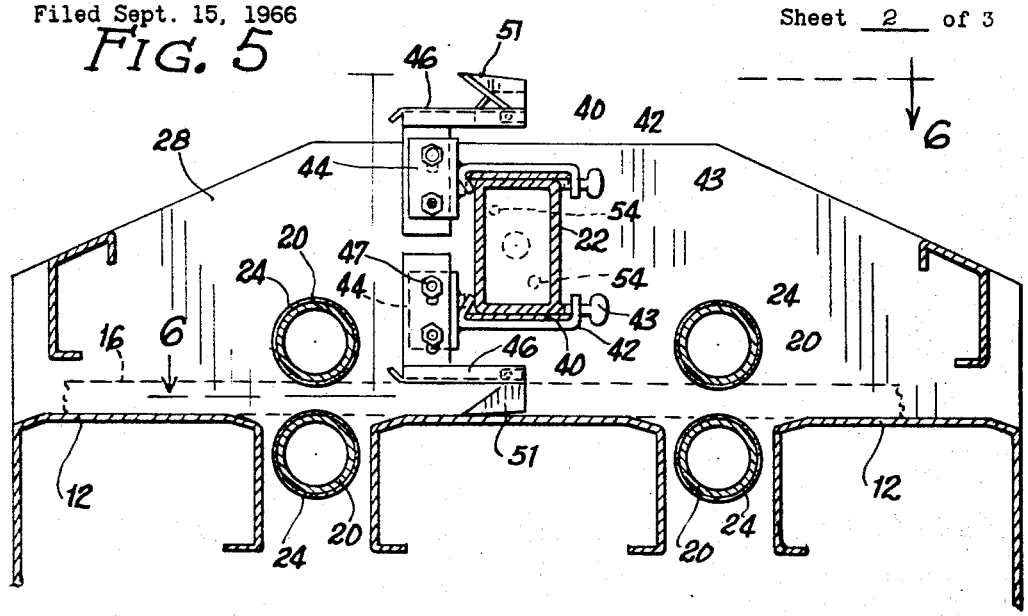
FIGURE 5 is an enlarged cross-sectional view taken about the line 5—5 of FIGURE 1.
Figure 6:
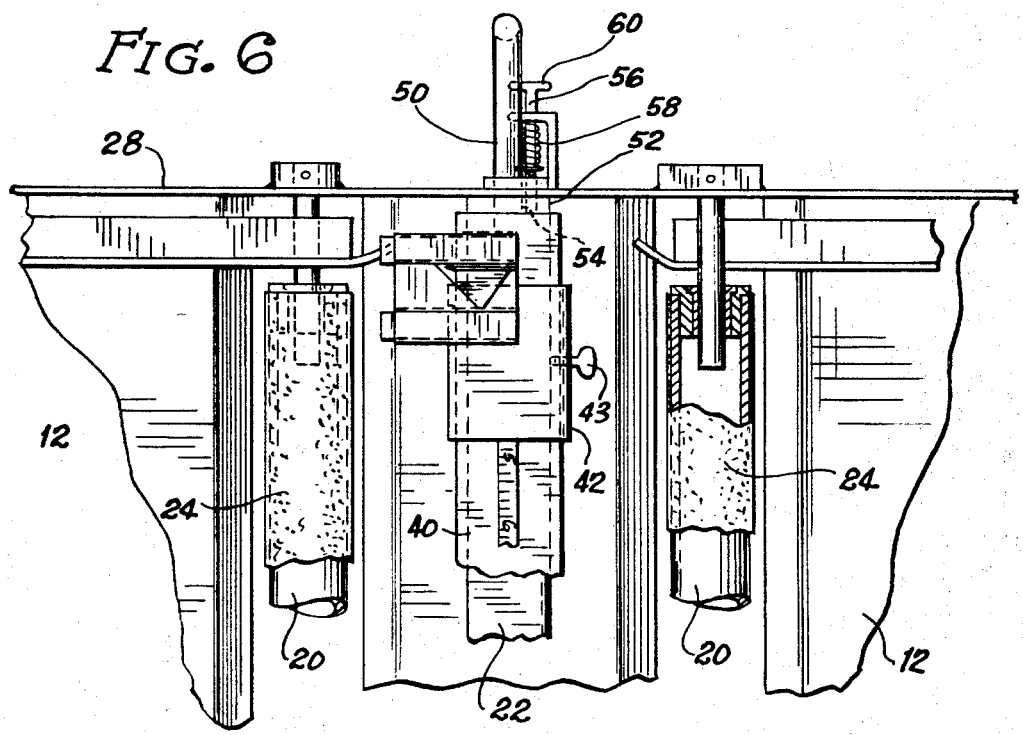
FIGURE 6 is a fragmentary plan view taken about the line 6—6 of FIGURE 5.
Figure 7:
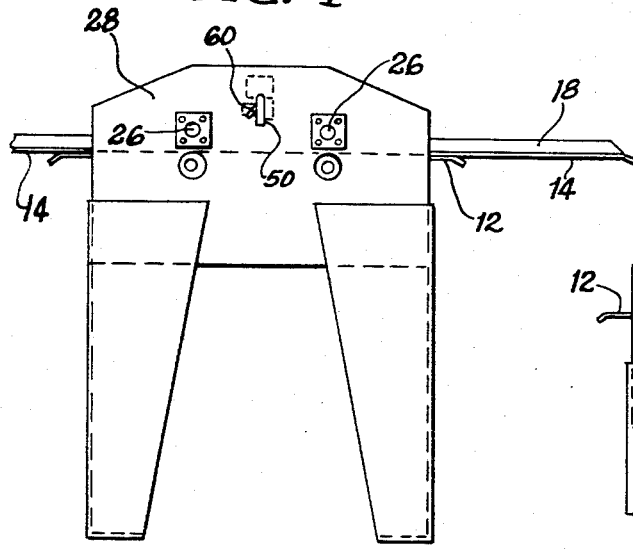
FIGURE 7 is a vertical end elevation of the construction shown in FIGURE 1.

Sets of drive rollers 20 are rotated on opposite sides of a centrally located tool carrying beam 22. As best shown in FIGURE 5, the drive rollers 20 are spaced apart whereby a fiberboard 16 will fit between the rollers. Each of the rollers has an abrasive sleeve 24 fitted around the roller body. This abrasive sleeve which may have a sandpaper texture greatly increases the gripping power of the drive rollers without necessitating any undue amount of pressure being exerted by the rollers on the boards.

Figure 8:
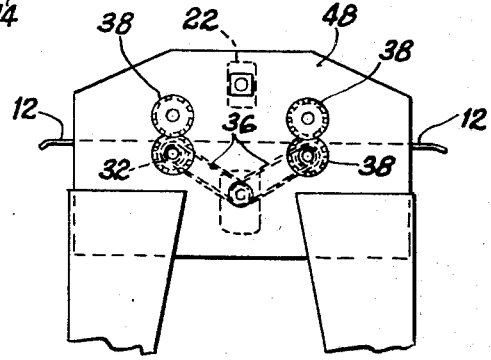
FIGURE 8 is a fragmentary view of the opposite end of the construction shown in FIGURE 1.

The shafts 26 of the drive rollers are journalled in a side plate 28, this plate also providing a mount for the beam 22. The shafts 30 at the opposite ends of the drive rollers are connected to drive sprockets 32. As best shown in FIGURE 8, a gear motor 34 drives chains 36 which in turn drive the sprockets 32. Gears 38 mounted at the extreme end of the shaft portions 30 serve to transmit driving action from the directly driven lower set of rollers to the idler set of drive rollers.

The beam 22 is provided with a plate 40 attached to each of the opposed horizontal surfaces of the beam. The extending portions of the plates 40 provide for attachment of a clamp means 42. Each clamp means carries a bracket 44 which serves as a means for mounting the tool elements 46. Set screws 43 form a part of the clamp means to permit attachment to the beam, and it will be appreciated that with this arrangement, individual tools can be repositioned and locked at any given location along the length of a beam 22. Furthermore, it will be obvious that individual tools can be removed from the beam and can be replaced by other tools as the need arises.

The tools 46 are attached to the bracket 44 by means of bolts 47. It will be noted that slots 49 are provided whereby the vertical position of the tools can be accurately adjusted. The blade portions 51 of the tools are adapted to be tilted to a slight degree whereby the leading edge 53 will actually extend beyond the bottom edge of the board. This insures complete cutting through the outer backing 64 of the board.

The beam 22 is journalled in the plate 28 and in a similar plate 48 located at the opposite end of the construction. An extension 50 of the beam provides a handle whereby the beam can be rotated with respect to the plates 28 and 48.

An end portion 52 of the beam defines an opening 54. A pin 56 is normally urged toward this end portion of the beam by means of spring 58. The end of the pin will, therefore, pass into the opening 54 when this opening is aligned with the pin. A handle 60 is provided for the pin whereby it can be withdrawn from the opening 54 for purposes of unlocking the beam.

Figure 9:
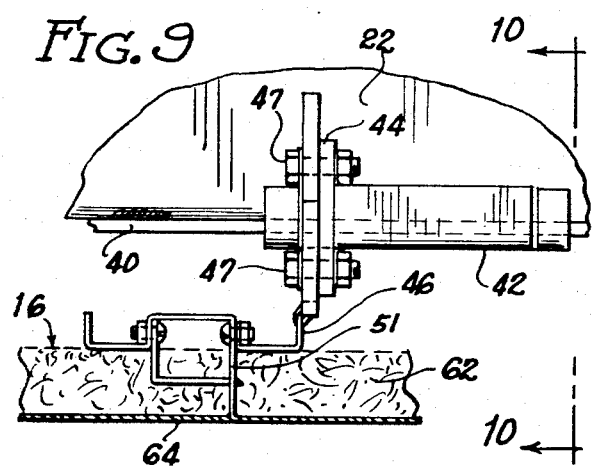
FIGURE 9 is an enlarged fragmentary view illustrating the manner in which cutting means form the fiberboard.
Figure 10:
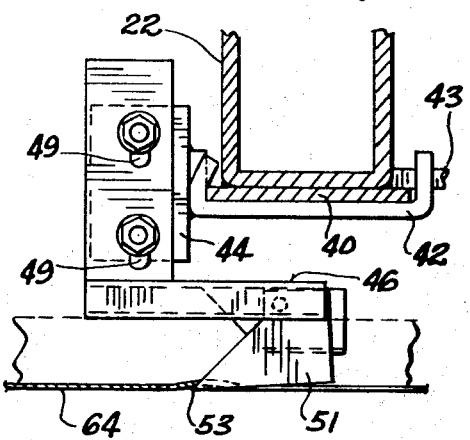
FIGURE 10 is a side view taken about the line 10—10 of FIGURE 9.

As noted, an important factor of the instant invention involves the provision of different sets of tools for operating on the same fiberboard. To accomplish this, the board is moved through the machine whereby one set of tools will cut into the board in the manner illustrated in FIGURES 9 and 10. The particular tool shown in these figures provides the cut illustrated at 61 in FIGURE 11.

When the board has been moved through the machine, the pin 56 is moved outwardly by means of the handle 60, and the pin is rotated by means of the handle 50. The pin 56 can be released as soon as rotation of the beam is initiated. The end of the pin will then bear against the surface of the beam until the pin snaps into the other hole 54 formed in the beam. These holes are located 180° apart; however, it will be appreciated that variations in the beam design can be accomplished to permit mounting of additional sets of tools. There would, of course, then be more than two operative positions for the beam.

The operation of the illustrated construction will be described with reference to the formation of a glass fiber sheet to be employed for building ducts. To begin such an operation, a sheet 16 is first passed through the machine longitudinally as illustrated to the left of FIGURE 1. A pair of tools is attached to the beam whereby the respective side edges of the sheet will be operated on by the tools. It will be appreciated in this connection that the particular tools employed do not form a part of this invention. Thus, tool configurations employed for manually forming the sheets are available. Various blade designs can be provided whereby the necessary cuts can be made. It will also be appreciated that in some instances, more complex cuts can be made by employing different tools operating on the same area of the board.

In the example illustrated, the board is initially cut to provide edge configurations as shown in FIGURE 2. The board is then rotated 90° while the tool carrying beam 22 is rotated through 180° whereby a different set of tools 46 will be located in the operative position. A reversing switch associated with the motor 34 is then operated whereby the drive rollers will move the board back through the construction, this second cutting operation will result in the board configuration illustrated in FIGURES 3, 11 and 12.

In the actual formation of a duct, the board is folded in the areas having the V-shaped grooves whereby a rectangular configuration will be achieved. In considering the particular cuts made by the tools, it will be noted that the fiberboards 16 each comprise a glass fiberboard section 62 and a backing sheet 64. The cutting operations provide a free backing sheet portion 66 along a longitudinal edge of each sheet and a similar portion 68 along a transverse edge of each sheet. The free portion 63 permits stapling of the duct to secure the rectangular configuration of FIGURE 4. The free portion 66 combines with the opposite end of the duct to provide a tongue and groove arrangement and to permit additional stapling when adjacent sections are joined together.

It will be understood that various changes and modifications may be made in the above described construction which provide the characteristics of this invention without departing from the spirit thereof particularly as defined in the following claims.

That which is claimed is:

1. A machine for cutting formations of different shapes in fiberboard comprising a table, a beam mounted above said table, said beam including cutting tools, means for positioning a first cutting tool having a cutting edge of one shape in an operative position and a second cutting tool having a cutting edge of second shape in an inoperative position, means for moving said fiberboard in one direction relative to said beam whereby the operative cutting tool carried by the beam will cut a formation in the fiberboard having said one shape, means for repositioning said tools whereby said first tool is inoperative and said second tool is now operative, and said moving means being capable of moving said fiberboard in the opposite direction relative to said beam whereby the second cutting tool will cut another formation in said fiberboard having said second shape.

2. A machine in accordance with claim 1 wherein said beam is stationary and including drive rollers for moving said board with respect to said tools, and including means for reversing said drive rollers to provide for movement of said board in both directions.

3. A machine in accordance with claim 2 wherein said drive rollers are provided with an abrasive covering to provide for improved gripping of the board by the drive rollers.

4. A machine in accordance with claim 1 wherein said tools are releasably clamped to said beam whereby the positions of said tools can be adjusted with respect to the beam and whereby the tools can be removed from the beam.

5. A machine in accordance with claim 4 wherein sets of tools are adapted to be mounted on upper and lower sections of said beam, and wherein said beam is rotated 180° about its axis for positioning said tools.

6. A machine in accordance with claim 5 including means for locking said beam in each position whereby the respective sets of tools will be precisely aligned during formation of the board.

7. A machine in accordance with claim 6 including mounting means for said beam, pin means associated with said mounting means, openings defined in said beam for receiving said pin means to thereby lock the beam relative to said mounting means, and spring means normally urging said pin means against said beam, said pin means being adapted to be retracted and said pin means being adapted to ride on a surface of the beam during rotation of the beam through 180° and being adapted to snap into one of said openings as the beam ends its rotation.

8. A machine in accordance with claim 1 wherein each of said tools is adjustably mounted on the beam whereby the tools can be accurately positioned for purposes of cutting through said board.

References Cited

UNITED STATES PATENTS 2,968,326  1/1961  Myers _____ 144—136
3,093,037  6/1963  Ward _____ 93—58.2

ANDREW R. JUHASZ, *Primary Examiner.*

G. WEIDENFELD, *Assistant Examiner.*

U. S. Cl. X.R.

144—136; 93—58